United States Patent
Deng et al.

(10) Patent No.: US 12,174,082 B1
(45) Date of Patent: Dec. 24, 2024

(54) INTEGRATED DETECTION TEST DEVICE FOR DRILL BIT AND ROTARY BLOWOUT PREVENTER AND DETECTION METHOD THEREOF

(71) Applicants: Sichuan Hongda Security Technology Service Co., Ltd, Deyang (CN); Sichuan Kete Testing Technology Co., Ltd, Deyang (CN)

(72) Inventors: Yonggang Deng, Deyang (CN); Shundong Tang, Deyang (CN); Gang Wang, Deyang (CN); Wenbin Chen, Deyang (CN); Yi Tang, Deyang (CN); Shanji Wang, Deyang (CN); Jiajie Ye, Deyang (CN); Tao Yuan, Deyang (CN); Qi Yang, Deyang (CN); Xudong Wang, Deyang (CN); Yuke You, Deyang (CN); Zhe Wang, Deyang (CN); Jian Zhang, Deyang (CN); Hanjun Liu, Deyang (CN); Heng Yang, Deyang (CN); Xun Cai, Deyang (CN)

(73) Assignees: Sichuan Hongda Security Technology Service Co., Ltd, Deyang (CN); Sichuan Kete Testing Technology Co., Ltd, Deyang (CN)

( * ) Notice: Subject to any disclaimer, the term of this patent is extended or adjusted under 35 U.S.C. 154(b) by 0 days.

(21) Appl. No.: 18/782,370

(22) Filed: Jul. 24, 2024

(51) Int. Cl.
*G01M 13/00* (2019.01)
*E21B 10/00* (2006.01)
*E21B 33/06* (2006.01)

(52) U.S. Cl.
CPC ............. *G01M 13/00* (2013.01); *E21B 10/00* (2013.01); *E21B 33/06* (2013.01)

(58) Field of Classification Search
CPC .......... E21B 10/00; E21B 33/06; E21B 19/00; E21B 19/18; E21B 19/16
See application file for complete search history.

(56) References Cited

U.S. PATENT DOCUMENTS

2020/0199949 A1* 6/2020 Magnuson ............... E21B 15/00

FOREIGN PATENT DOCUMENTS

| CN | 104995370 B | 10/2015 | |
|---|---|---|---|
| CN | 107219084 A * | 9/2017 | .......... G01M 99/008 |

(Continued)

OTHER PUBLICATIONS

Zhang et al., Chinese Patent No. 107219084, Sep. 2, 2017, english trasnlation dated Sep. 5, 2024. (Year: 2017).*

(Continued)

*Primary Examiner* — Caroline N Butcher
(74) *Attorney, Agent, or Firm* — Birchwood IP (57) ABSTRACT

An integrated detection test device for a drill bit and a rotary blowout preventer and a detection method thereof are provided. The test device includes a support frame, a rotary shaft is mounted on the support frame, and an upper end of the rotary shaft is connected to a piston rod of a first hydraulic cylinder fixed on the support frame; and the rotary shaft is connected to a driving device through a rotary disc sleeved outside the rotary shaft. A pit sinking to a fixing plane of the support frame is arranged below the support frame; and an L-shaped track and a transport vehicle slidably connected to the track are mounted in the pit and used to transport the rotary blowout preventer or the drill bit test bench to a test position.

10 Claims, 9 Drawing Sheets

(56) References Cited

FOREIGN PATENT DOCUMENTS

| CN | 107219084 B | | 9/2017 | | |
|---|---|---|---|---|---|
| CN | 107709696 A | | 2/2018 | | |
| CN | 110749521 B | | 2/2020 | | |
| CN | 213023069 U | | 4/2021 | | |
| CN | 111458083 B | * | 12/2022 | .............. | G01M 3/26 |

OTHER PUBLICATIONS

Liu et al., Chinese Patent No. 111458083, Dec. 6, 2022, english translation dates Sep. 5, 2024. (Year: 2022).*

* cited by examiner

INTEGRATED DETECTION TEST DEVICE FOR DRILL BIT AND ROTARY BLOWOUT PREVENTER AND DETECTION METHOD THEREOF

CROSS-REFERENCE TO RELATED APPLICATIONS

This application claims priority to Chinese Patent Application No. 202310947233.1, filed on Jul. 28, 2023, which is hereby incorporated by reference in its entirety.

TECHNICAL FIELD

The present invention relates to the technical field of detection test devices for drilling equipment, and specifically to an integrated detection test device for a drill bit and a rotary blowout preventer and a detection method thereof.

BACKGROUND

In oil drilling operations, a drill bit is a rock-breaking tool in the drilling process. The quality of the drill bit directly affects the drilling speed and thus the drilling cost. At present, with the continuous deepening of oil exploration and development wells, stratum rocks to be drilled by a drill bit are more and more complex, and the types of the drill bit used are also increasing. The inspection of drill bit quality is more important.

A rotary blowout preventer is a key device for the successful implementation of underbalanced drilling, and has the main functions of continuously maintaining normal drilling and performing drilling under pressure when there is a certain casing pressure at the wellhead. Once the rotary blowout preventer is not qualified, serious safety accidents will occur. Therefore, before the rotary blowout preventer is used on site, the rotary blowout preventer must be strictly inspected based on relevant detection standards to ensure the safety of drilling operations.

To ensure the normal process of drilling operations, a drill bit detection test and a rotary blowout preventer detection test are required before the operations to ensure that the drill bit and the rotary blowout preventer are qualified. However, in an actual detection test, two sets of detection equipment need to be purchased for detecting the drill bit and the rotary blowout preventer respectively. The price of the detection equipment is high, which increases the test cost, and the equipment system is huge, which occupies a large test space.

SUMMARY

Aiming at the problems in the prior art, the present invention provides an integrated detection test device for a drill bit and a rotary blowout preventer and a detection method thereof, which solves the problems in the prior art that two sets of large equipment need to be purchased for detection tests of a drill bit and a rotary blowout preventer, resulting in high test cost and large occupied space.

To achieve the above objective, the present invention uses the following technical solutions.

According to a first aspect, provided is an integrated detection test device for a drill bit and a rotary blowout preventer, which comprises a support frame, wherein a rotary shaft is mounted on the support frame, and an upper end of the rotary shaft is connected to a first hydraulic cylinder fixed on the support frame; the rotary shaft is connected to a driving device through a rotary disc sleeved outside the rotary shaft; a pit sinking to a fixing plane of the support frame is arranged below the support frame; an L-shaped track and a transport vehicle slidably connected to the track are mounted in the pit, the transport vehicle is connected to a piston rod of a third hydraulic cylinder when reaching a preset position, and the first hydraulic cylinder and the third hydraulic cylinder are both connected to a hydraulic station;

a fixed base for fixing a drill bit test bench is mounted at a tail end of the track positioned right below the support frame; the drill bit test bench comprises a specimen platform, a specimen groove for placing a specimen is formed in the specimen platform, and a through hole penetrating through the specimen platform is formed in a bottom of the specimen groove; a platform support base is fixed at a bottom of the specimen platform and is connected to the fixed base in a detection state; a cavity for accommodating a clamping device is arranged inside the platform support base; a pressing device for pressing the specimen is movably connected to the specimen platform;

when the drill bit test bench is lifted, a lower end of the rotary shaft is connected to the clamping device through a rotary shaft joint; when the drill bit is detected, the lower end of the rotary shaft is connected to the drill bit; when the rotary blowout preventer is detected, the lower end of the rotary shaft is connected to a test drill pipe; the clamping device comprises a rod, a claw and a driving mechanism for folding and unfolding the claw relative to the rod, and the rotary shaft is connected to the rod through the rotary shaft joint; and a control console and a pressure test pump for pressurizing during the test are mounted on one side of the hydraulic station; and the hydraulic station, the driving device and pressure test pump are all electrically connected to the control console.

The present invention has the beneficial effects as follows: the present invention firstly develops an integrated detection test device for a drill bit and a rotary blowout preventer with complete functions, and the drill bit detection test and the rotary blowout preventer detection test share a set of large test equipment such as a hydraulic station, a support frame, a rotary shaft, a driving device and a control console, so that the test space and the test cost are significantly saved.

The arrangement of the pit can reduce the overall height of the support frame, and improve the stability and safety of the test device. The drill bit test bench and the rotary blowout preventer are large and heavy, making it inconvenient to use manual switching equipment. Therefore, it is necessary to add an auxiliary switching device, such as a track, a transport vehicle and a clamping device. The track, the transport vehicle and the third hydraulic cylinder are convenient for transporting the drill bit test bench or the rotary blowout preventer. The L-shaped track is arranged because the rotary blowout preventer needs to be hoisted into the pit by an overhead crane when the rotary blowout preventer is subjected to a detection test. Since the drill bit test bench does not need to be hoisted frequently by the overhead crane, the drill bit test bench can be always fixed on the transport vehicle and placed at one end of the L-shaped track far away from the fixed base, so that the transportation of the rotary blowout preventer is not affected when the rotary blowout preventer is subjected to the detection test, and meanwhile, the preparation work of drill bit detection test is simplified. The clamping device can extend into the through hole of the drill bit test bench, and the drill bit test bench can be lifted by using the first hydraulic cylinder to fix the drill bit test bench on the fixed base to start the test.

The driving device can drive the rotary shaft to rotate, the first hydraulic cylinder can control the lifting of the rotary shaft, and the test drill pipe or the test drill bit can rotate and lift at the same time during detection.

Further, a water accumulation tank sinking to a bottom surface of the pit is also arranged in the pit, the water accumulation tank is connected to a water storage tank through a pump and a pipeline, and the pump is electrically connected to the control console. A water through hole penetrating through the entire rotary shaft is formed in an axial center of the rotary shaft, and a water through hole is formed in a center of the first hydraulic cylinder; the water through hole is connected to the water storage tank through a pipeline, a pump and a cooling joint; the pump is electrically connected to the control console; and a ball valve is arranged on the drill bit test bench, one end of the ball valve is communicated with the through hole, and the other end of the ball valve is communicated with the water accumulation tank.

The beneficial effects of the above technical solution are as follows: considering the drainage of a cooling liquid for drill bit performance detection test and a liquid for flushing iron scraps, a water accumulation tank is arranged in the pit during design, and water in the water accumulation tank can be drained to the water storage tank for recycling. The pump is opened and cooling water is introduced into the water through hole, the drill bit can be cooled and the broken iron scraps can be conveniently washed when the drill bit detection test is performed, and the used cooling water is discharged to the water accumulation tank through the ball valve.

Further, the driving device comprises a coupler, a motor and a driver which are connected in sequence, and the coupler is connected to the rotary disc. The rotation of the rotary shaft is driven by the driving device, and the rotary disc can convert the horizontal rotation motion of the motor into the vertical rotation motion of the rotary shaft.

Further, the rotary disc comprises a rotary disc base and a rotary disc bushing, a support base for supporting the first hydraulic cylinder is mounted on the rotary disc base, a center of the rotary disc base is connected to the rotary disc bushing through a rotary bearing, and a spline groove matched with a spline shaft of the rotary shaft is formed in an inner wall of the rotary disc bushing; and a circle of conical toothed disc is sleeved outside the rotary disc bushing, the conical toothed disc is vertical to and meshed with a conical gear, and a shaft of the conical gear is fixed on the support base through a bearing and connected to the coupler.

The beneficial effects of the above technical solution are as follows: the driving device drives the conical gear to rotate, and the conical gear drives the conical toothed disc to rotate and drives the rotary disc bushing to rotate, thereby driving the rotary shaft to rotate. The mutually vertical conical gear and the conical toothed disc can convert the horizontal rotation motion of the motor into the vertical rotation motion of the rotary shaft. The support base can better fix and support the first hydraulic cylinder, and can also fix the conical gear.

Further, a second hydraulic cylinder is mounted on the support frame, the test drill pipe is connected to a piston rod of the second hydraulic cylinder in a non-detection state, and the second hydraulic cylinder is connected to the hydraulic station. In the test preparation stage, the second hydraulic cylinder is used to press the test drill pipe into the rotary blowout preventer, so that the test drill pipe is fixedly connected to the rotary blowout preventer.

Further, the claw comprises a rotary arm, one end of the rotary arm is hinged with a clamp base, and the other end of the rotary arm is hinged with a claw head; an inner side of the claw head is provided with an anti-slip pattern, and an outer side of the claw head is provided with a flexible pad; and an anti-slip platform for clamping the claw is arranged around a bottom of the through hole. The driving mechanism comprises a driving motor and a lead screw connected to a tail end of the rod through a bearing, and the lead screw is not in contact with the rod. The lead screw is connected to the clamp base through a bearing, and one end of the lead screw penetrating through the clamp base is connected to the driving motor fixed on the clamp base; and the lead screw is slidably connected to a sliding block, and the rotary arm is hinged with the sliding block through a limiting connecting arm.

The beneficial effects of the above technical solution are as follows: the claw of the clamping device can extend into the through hole when being in a folded state, the first hydraulic cylinder is started to drive the clamping device to move downwards, after the claw extends out of the through hole, the claw is controlled to open and clamp the anti-slip platform of the through hole, the first hydraulic cylinder is started again to move upwards, and the claw drives the entire drill bit test bench to move upward together. An inner side of the claw head is in contact with the anti-slip platform, the anti-slip pattern on the claw head can increase a static friction force, and the flexible pad arranged on an outer side of the claw head can prevent the claw head from colliding with a wall of the through hole.

Further, a circle of counter bores with the same position and size are arranged at the bottom of the platform support base and the bottom of the rotary blowout preventer; and a circle of connecting members matched with the counter bores at the bottom of the platform support base and the bottom of the rotary blowout preventer are arranged on the transport vehicle. The connecting member may be inserted into the counter bore to prevent relative movement between the transport vehicle and the drill bit test bench or the rotary blowout preventer during transportation.

Further, the pressing device comprises a threaded rod and a locking nut, and a pressing plate is fixed at one end of the threaded rod extending into the specimen platform and can press the specimen placed on the specimen platform.

Further, the test device is provided with an eddy current sensor for monitoring the rotation speeds of the drill bit and a cone, a torque sensor for monitoring the torque of the driving device, a displacement sensor for monitoring the displacement conditions of the first hydraulic cylinder, the second hydraulic cylinder and the third hydraulic cylinder, a pressure sensor for monitoring the bit pressure during the drill bit detection test, a temperature sensor for monitoring the temperature of the rotary blowout preventer shell, a pressure transmission for monitoring the piston pressures of the first hydraulic cylinder, the second hydraulic cylinder and the third hydraulic cylinder, and a plurality of monitoring cameras for observing the operation of the equipment. The eddy current sensor is connected to a data acquisition card; the torque sensor, the displacement sensor, the temperature sensor, the pressure sensor and the pressure transmission are all connected to the data acquisition card; the data acquisition card and the camera are electrically connected to the control console; and the control console is provided with a plurality of control buttons and a display screen for displaying parameter change curves and real-time monitoring videos.

The beneficial effects of the above technical solution are as follows: the measurement of dynamic parameters such as the drilling pressure, the torque, the drill bit rotation speed, the cone rotation speed, the moving displacement of the first hydraulic cylinder, the second hydraulic cylinder and the third hydraulic cylinder, the piston pressures of the first hydraulic cylinder, the second hydraulic cylinder and the third hydraulic cylinder, and the temperature of the rotary blowout preventer shell in the processes of the rotary blowout preventer performance detection test and the drill bit performance detection test are achieved by electric measurement and different types of sensors serving as conversion elements.

According to a second aspect, the present invention further provides a method of a drill bit detection test, which comprises the following steps:
- S1: fixing a drill bit test bench on a transport vehicle, wherein an initial position of the drill bit test bench is positioned at one end of an L-shaped track far away from a fixed base; putting a specimen into a specimen platform, and pressing the specimen by adopting a pressing device;
- S2: moving the transport vehicle and the drill bit test bench thereon from the initial position to a turning point of the L-shaped track, and connecting the transport vehicle and the drill bit test bench with a piston rod of a third hydraulic cylinder; starting the third hydraulic cylinder to push the transport vehicle to a position right above the fixed base, and connecting a lower end of a rotary shaft with a clamping device;
- S3: starting a first hydraulic cylinder to drive the clamping device to move vertically downwards, and starting a driving mechanism of the clamping device to fold a claw and extend the folded claw into a through hole of the drill bit test bench;
- S4: after the claw extends into the through hole, starting a driving motor of the clamping device to open the claw and clamp the anti-slip platform at the bottom of the through hole, and controlling the clamping device to move upwards by the first hydraulic cylinder to lift the drill bit test bench;
- S5: moving away the transport vehicle, and putting down the drill bit test bench to be fixedly connected to the fixed base;
- S6: disassembling the clamping device, connecting the lower end of the rotary shaft with a drill bit, and performing the drill bit detection test; and
- S7: after completing the test, detaching the drill bit, mounting the clamping device, lifting the drill bit test bench and placing on the transport vehicle, pulling the transport vehicle back to the turning point by the third hydraulic cylinder, and returning the transport vehicle and the drill bit test bench thereon to the initial position.

In the drawings, 1: support frame; 101: support base; 2: rotary shaft; 201: water through hole; 202: rotary disc; 2021: conical gear; 2022: conical toothed disc; 2023: rotary disc bushing; 2024: rotary disc base; 2025: rotary bearing; 203: rotary shaft joint; 204: spline shaft; 205: spline groove; 3: hydraulic station; 301: first hydraulic cylinder; 302: second hydraulic cylinder; 303: third hydraulic cylinder; 304: piston rod; 4: rotary blowout preventer; 401: counter bore; 5: drill bit test bench; 501: pressing device; 5011: threaded rod; 5012: locking nut; 5013: pressing plate; 502: ball valve; 503: platform support base; 504: specimen platform; 5041: specimen groove; 505: through hole; 506: anti-slip platform; 6: driving device; 601: coupler; 602: motor; 603: driver; 7: test drill pipe; 8: drill bit; 901: water accumulation tank; 902: water storage tank; 10: cooling joint; 11: transport vehicle; 1101: connecting member; 12: fixed base; 13: clamping device; 1301: claw; 1302: rod; 1303: rotary arm; 1304: clamp base; 1305: claw head; 13051: flexible pad; 1306: sliding block; 1307: limiting connecting arm; 1308: lead screw; 1309: bearing; 1310: driving motor; 1311: driving mechanism; 14: pit; 15: track; 16: eddy current sensor; 17: torque sensor; 18: displacement sensor; 19: pressure sensor; 20: temperature sensor; 21: pressure transmission; 22: monitoring camera; 23: first data acquisition card; 24: second data acquisition card; 25: control console; 26: pressure test pump; 27: pump; and 28: pipeline.

DETAILED DESCRIPTION OF THE EMBODIMENTS

The following description of the specific embodiments of the present invention is provided to facilitate the understanding of the present invention by those skilled in the art, however, it should be understood that the present invention is not limited to the scope of the specific embodiments, and for those of ordinary skill in the art, various changes that are made without departing from the spirit and scope of the present invention as defined and determined by the appended claims are apparent, and all inventions and creations that are made by using the concept of the present invention are within the protective scope.

Figure 1:
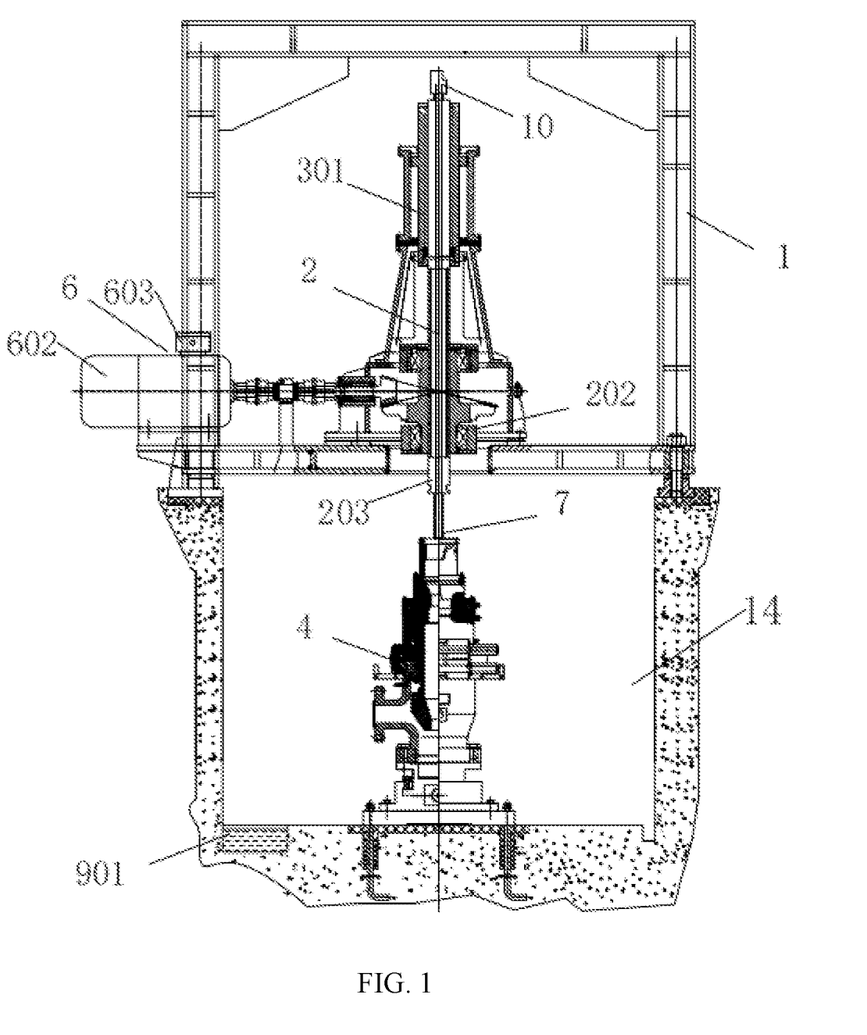
FIG. 1 is a schematic diagram of a structure of a detection test device for a rotary blowout preventer.
Figure 2:
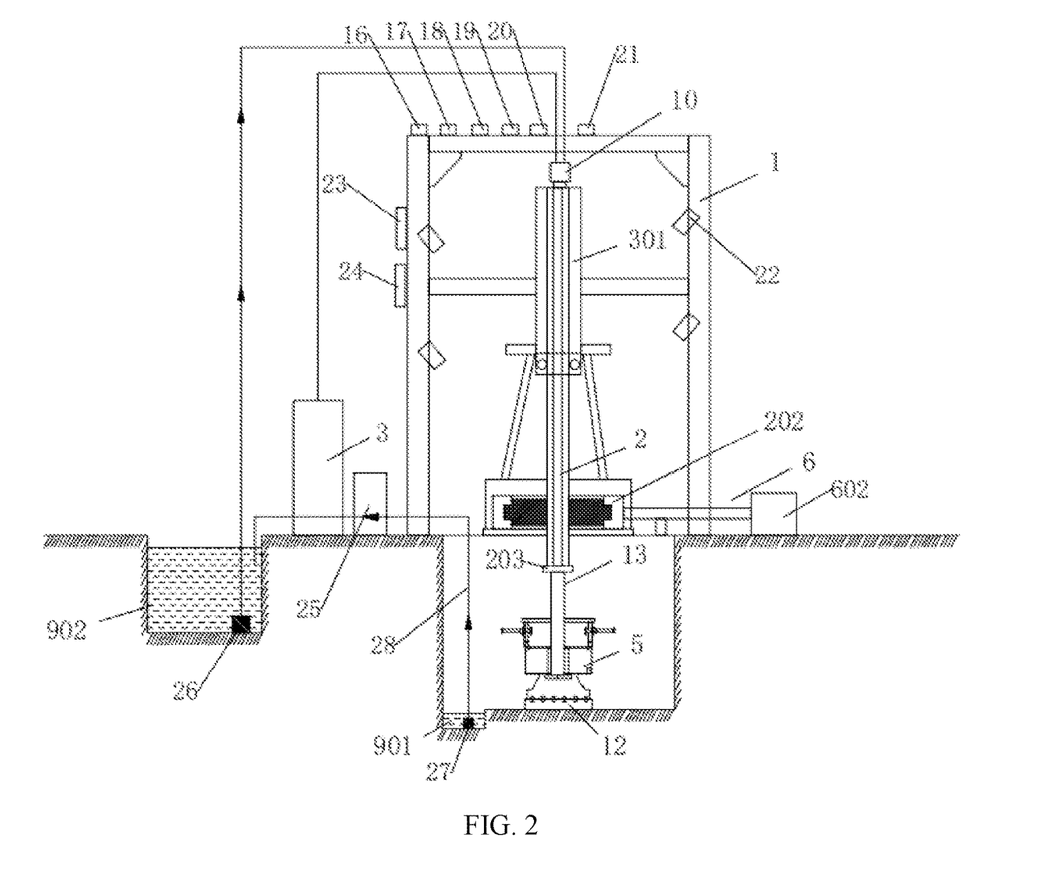
FIG. 2 is a mechanical system diagram of a drill bit detection test.

Referring to FIGS. 1 and 2, the integrated detection test device for the drill bit and the rotary blowout preventer comprises a support frame 1, wherein a rotary shaft 2 is mounted on the support frame 1, and an upper end of the rotary shaft 2 is connected to a piston rod of a first hydraulic cylinder 301 fixed on the support frame 1; and the rotary shaft 2 is connected to a driving device 6 through a rotary disc 202 sleeved outside the rotary shaft 2. A hydraulic station 3 is mounted on one side of the support frame 1, a control console and a pressure test pump for pressurizing during the test are mounted on one side of the hydraulic station 3, and when a rotary blowout preventer detection test is performed, the rotary blowout preventer 4 can be pressurized through the pressure test pump to simulate working conditions under pressure; and the hydraulic station 3, the driving device 6 and pressure test pump 26 are all electrically connected to the control console. To reduce the vibration effect during the drill bit test, an accumulator is preferably used in the hydraulic station 3, and the accumulator can provide a large flow of hydraulic oil instantly so as to achieve rapid automatic loading and reduce the vibration effect during the test.

Specifically, the driving device 6 comprises a coupler 601, a motor 602, and a driver 603, which are sequentially connected to the rotary disc 202. The coupler 601 is preferably a drum coupler, and the motor 602 and driver 603 are preferably a direct current motor and a direct current driver. The drill bit detection test needs to continuously work for 40 hours. Meanwhile, the test requires stepless speed regulation and forward and reverse rotation, so that the direct current driver is adopted to drive the direct current motor and the rotary disc 202 to achieve the rotation motion of the rotary shaft 2.

Figure 9:
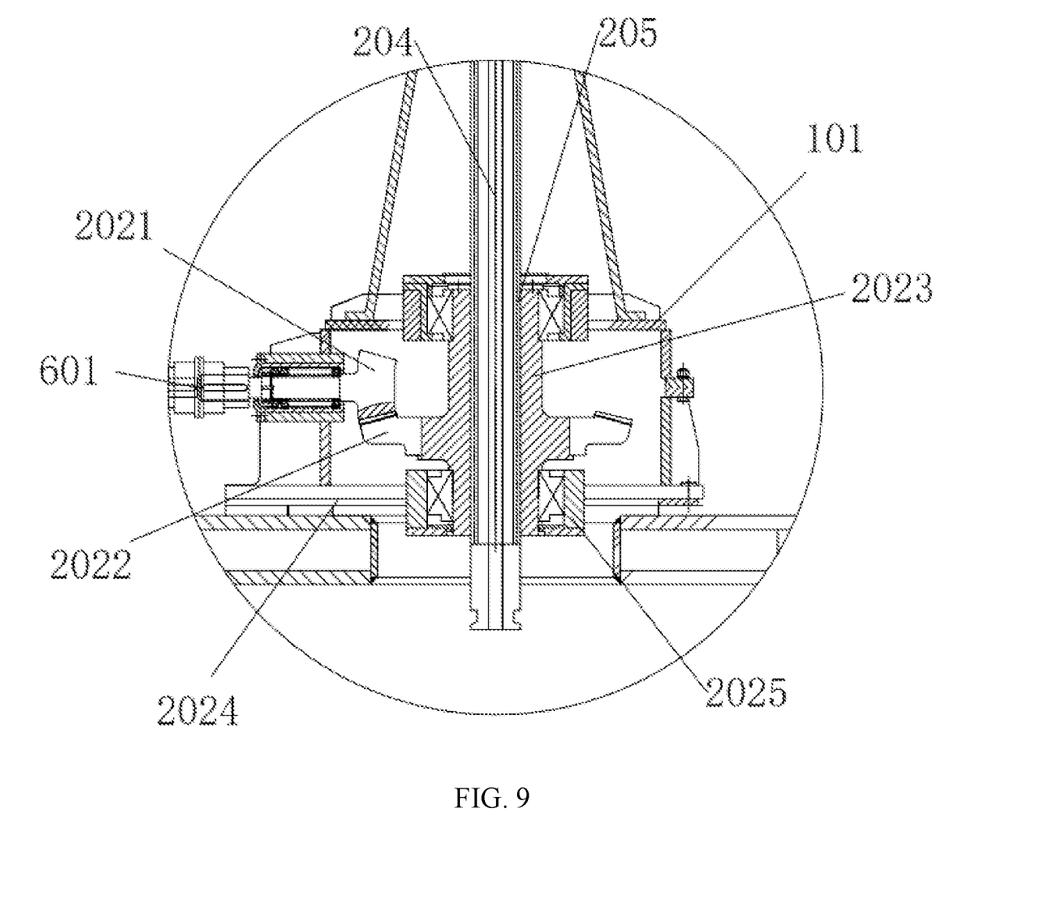
FIG. 9 is a schematic diagram of a structure of a rotary disc.

Referring to FIG. 9, the rotary disc 202 comprises a rotary disc base 2024 and a rotary disc bushing 2023, a support base 101 for supporting the first hydraulic cylinder 301 is mounted on the rotary disc base 2024, a center of the rotary disc base 2024 is connected to the rotary disc bushing 2023 through a rotary bearing 2025, a spline groove 205 matched with a spline shaft 204 of the rotary shaft 2 is formed in an inner wall of the rotary disc bushing 2023, so that the rotary disc 202 can drive the rotary shaft 2 to rotate, a circle of conical toothed disc 2022 is sleeved outside the rotary disc bushing 2023, the conical toothed disc 2022 is vertical to and meshed with a conical gear 2021, and a shaft of the conical gear 2021 is fixed on the support base 101 through a bearing and passes through the support base 101 to be connected to the coupler 601. The direct current driver drives the direct current motor to rotate, the conical gear 2021 is driven to rotate after the direct current motor passes through the coupler 601, and the conical gear 2021 drives the conical toothed disc 2022 to rotate, so that the horizontal rotary motion of the motor is converted into the vertical rotary motion. The conical toothed disc 2022 drives the rotary disc bushing 2023 to drive the rotary shaft 2, and the rotary shaft 2 drives the test drill pipe 7 or the drill bit 8 to rotate, so that the rotary motion required by performance tests of the rotary blowout preventer 4 or the drill bit 8 is achieved. The driving device 6 can drive the rotary shaft 2 to rotate, and the first hydraulic cylinder 301 can control the lifting of the rotary shaft 2. Since the spline shaft on the rotary shaft 2 and the spline groove on the inner wall of the rotary disc bushing 2023 are long enough, the spline shaft cannot be separated from the spline groove at the extreme position of the lifting of the rotary shaft 2. During the test, the test drill pipe 7 or drill bit 8 can be rotated and lifted at the same time.

In an implementation, it is preferable that a bearing is provided at a connecting portion between the rotary shaft 2 and the piston rod 304 of the first hydraulic cylinder 301, and the piston rod is connected upward by a transparent cover whose lower end is connected to a bearing sleeve, so that the rotary motion of the rotary shaft 2 driven by the rotary disc 202 is not transmitted to the piston rod of the first hydraulic cylinder 301. A tapered roller bearing is mounted in the bearing sleeve, an outer ring of the bearing is in interference fit with the bearing sleeve and does not rotate, and an inner ring of the bearing and the rotary shaft 2 rotate together.

Figure 3:
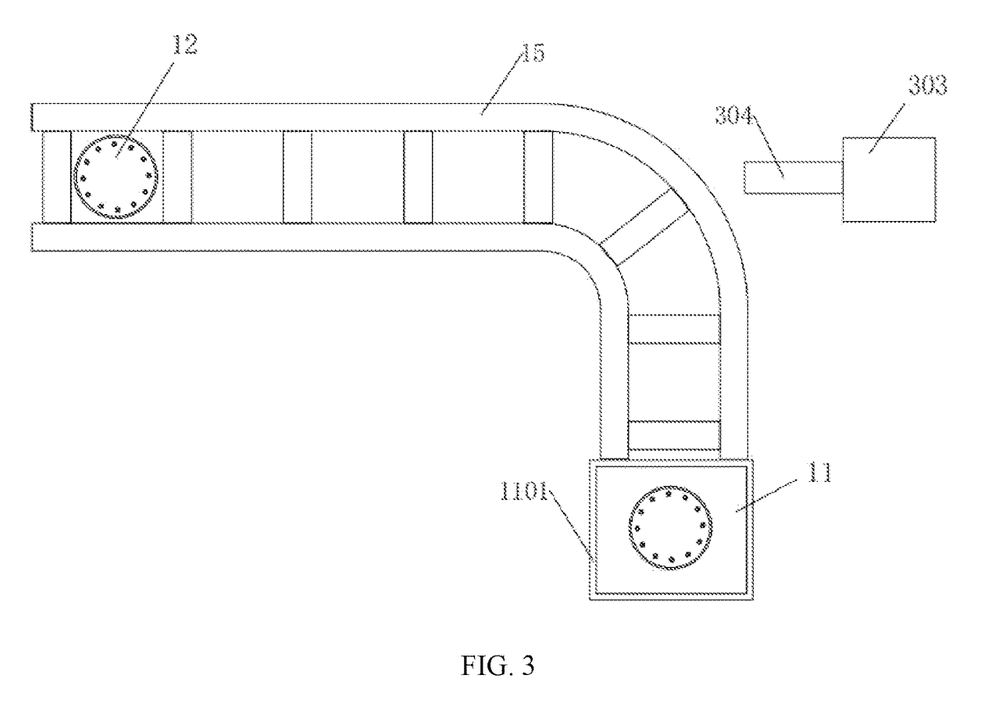
FIG. 3 is a schematic diagram of a structure of a track in a pit.
Figure 7:
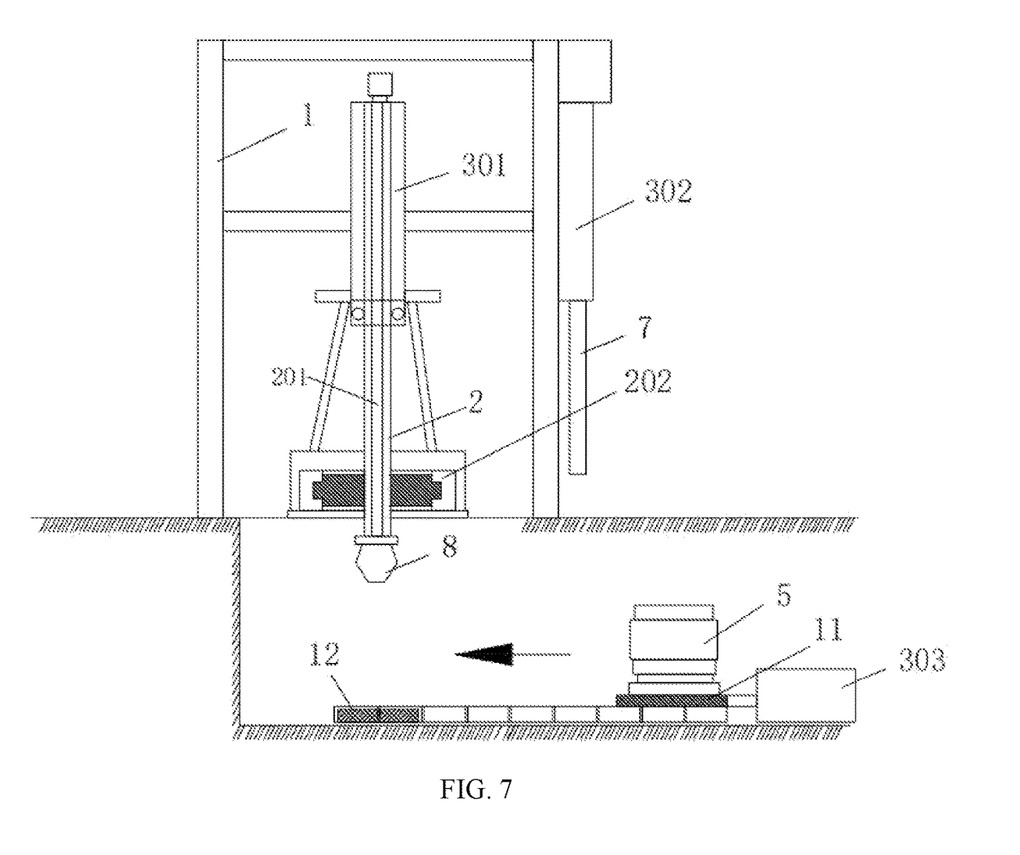
FIG. 7 is a schematic diagram of a transport vehicle moving along a track.

Referring to FIGS. 3 and 7, a pit 14 sinking to a fixing plane of the support frame 1 is arranged below the support frame 1, an L-shaped track 15 and a transport vehicle 11 slidably connected to the track 15 are mounted in the pit 14, the transport vehicle 11 is connected to a piston rod 304 of a third hydraulic cylinder 303 when reaching a preset position. A fixed base 12 for fixing the drill bit test bench 5 or the rotary blowout preventer 4 is mounted at a tail end of the track 15 positioned right below the support frame 1. When being pushed to the tail end of the track 15, the transport vehicle 11 is positioned right above the fixed base 12, which greatly facilitates the preparation work for the test.

The track 15, the transport vehicle 11 and the third hydraulic cylinder 303 are arranged, so that the drill bit test bench 5 and the rotary blowout preventer 4 with large weights can be transported conveniently; and when a rotary blowout preventer detection test is performed, the rotary blowout preventer 4 needs to be hoisted into the pit by an overhead crane and then transported to a position right below the support frame 1 by the transport vehicle 11. However, the drill bit test bench 5 does not need to be frequently hoisted by an overhead crane, and can be always fixed on the transport vehicle 11 and placed at one end of the L-shaped track far away from the fixed base 12, so that the transportation of the rotary blowout preventer 4 during the rotary blowout preventer detection test is not affected, and the transportation of the drill bit test bench 5 during the drill bit detection test is also facilitated.

The track is formed by welding I-shaped steel plates, and the moving stability of the drill bit test bench 5 or the rotary blowout preventer 4 needs to be ensured. In a detection test, the drill bit test bench 5 is directly connected to the fixed base 12, and the rotary blowout preventer 4 is fixedly connected to a connecting base with a wellhead flange firstly and then connected to the fixed base 12. During the design, it is considered that the drill bit test bench 5, the connecting base with the wellhead flange and the fixed base 12 bear large dynamic loads, these components are preferably made of cast steel, and therefore pressure bearing of the components and safety of the test process are ensured. To accurately obtain the drilling pressure fluctuation during the test, three pressure sensors are preferably mounted in the drill bit test bench 5.

The support frame 1 in the entire test device needs to bear the vibration load during the drill bit detection test, and also bears the torque. Since the load and the torque during the drill bit detection test are much larger than the load and the torque of the rotary blowout preventer detection test, the working condition of the drill bit detection test is mainly considered during the design, the designed support frame 1 must bear the influences of long-term impact dynamic load and large torque deformation in the test process, the mounting and stroke requirements of the first hydraulic cylinder 301 and the second hydraulic cylinder 302 are also considered, and the pit is arranged to reduce the overall height of the support frame 1 and improve the stability and the safety of the test device on the premise of ensuring the stroke requirement.

Figure 5:
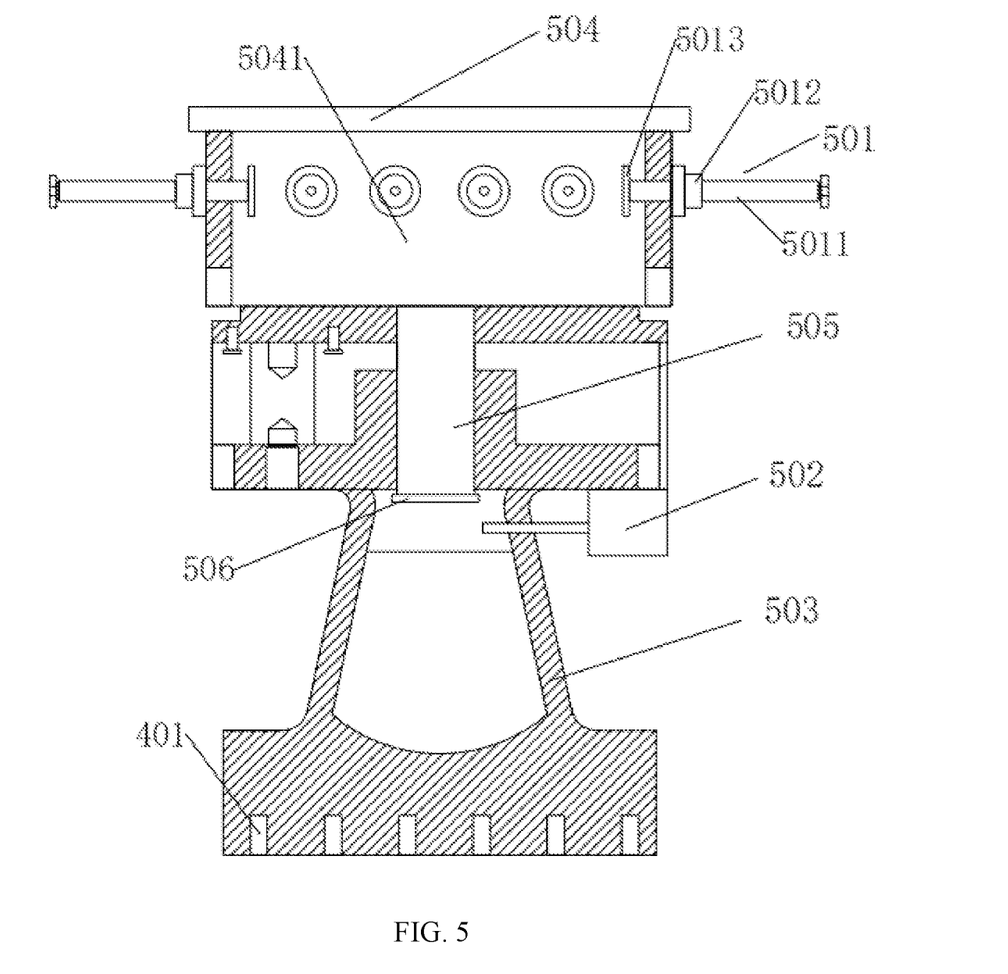
FIG. 5 is a cross-sectional view of a drill bit test platform.
Figure 6:
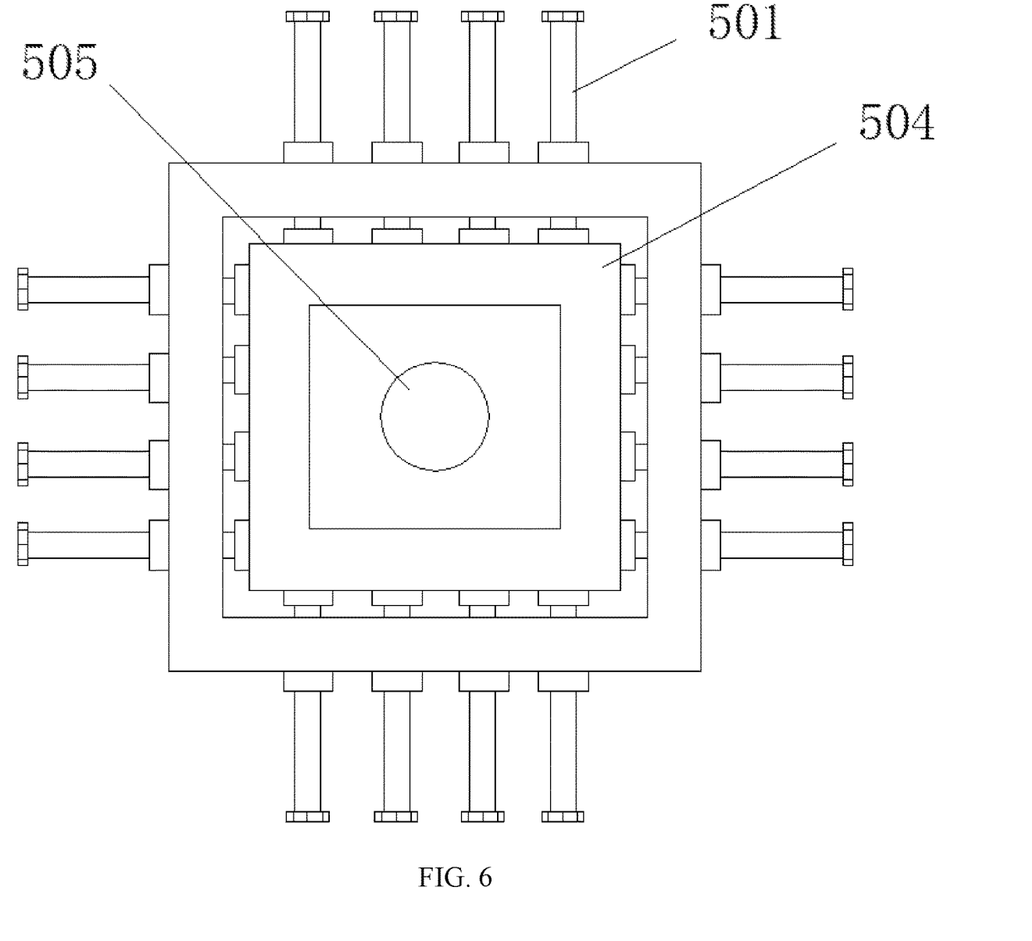
FIG. 6 is a top view of a drill bit test platform.

Referring to FIGS. 5 and 6, the drill bit test bench 5 comprises a specimen platform 504, and a specimen groove 5041 for placing a specimen is provided in the specimen platform 504. During the test, the drill bit 8 needs to drill into the specimen, and the specimen is preferably a 16 Mn steel block. The bottom of the specimen groove 5041 is provided with a through hole 505 penetrating through the specimen platform 504, the through hole 505 can allow cooling water to flow out, a buffer space can be formed to protect the specimen platform 504 and prevent the drill bit 8 from rotating excessively, and an anti-slip platform 506 for clamping by the clamping device 13 is further arranged around the bottom of the through hole 505. A platform support base 503 is fixed at the bottom of the specimen platform 504, a cavity capable of accommodating the clamping device 13 is arranged inside the platform support base 503, and the platform support base 503 can be connected to the fixed base 12. A circle of counter bores 401 with the same position and size are arranged at the bottom of the platform support base 503 and the bottom of the rotary blowout preventer 4; and a circle of connecting members 1101 matched with the counter bores 401 at the bottom of the platform support base 503 and the bottom of the rotary blowout preventer 4 are arranged on the transport vehicle 11, and the connecting members 1101 can be inserted into the counter bores to prevent the relative movement between the transport vehicle 11 and the drill bit test bench 5 or the rotary blowout preventer 4 during transportation. The specimen platform 504 is movably connected to the pressing device 501, the pressing device 501 comprises a threaded rod 5011 and a locking nut 5012, a pressing plate 5013 is fixed at one end of the threaded rod 5011 extending into the specimen platform 504, and the threaded rod 5011 of the pressing device 501 can move relative to the specimen platform 504, so that the extending length is adjusted to facilitate the matching of the specimens with different sizes. The pressing plate 5013 can increase the contact area with the specimen to press the specimen, and the specimen is also locked after the threaded rod is locked by the locking nut. Sixteen clamping devices 501 are preferably arranged, with four on each side surface of the specimen platform 504.

Referring to FIG. 7, a second hydraulic cylinder 302 is further mounted on the support frame 1, and the test drill pipe 7 is connected to the second hydraulic cylinder 302 in a non-detection state. In preparation for the rotary blowout preventer detection test, the second hydraulic cylinder is used to press the test drill pipe 7 into the rotary blowout preventer 4. The first hydraulic cylinder 301, the second hydraulic cylinder 302 and the third hydraulic cylinder 303 are all connected to the hydraulic station 3.

In consideration of the cooling in the drill bit performance detection test and the drainage of a liquid for flushing iron scraps, a water accumulation tank 901 sinking to the bottom surface of the pit is arranged in the pit during the design, the water accumulation tank 901 is connected to a water storage tank 902 through a pump 27 and a pipeline 28, the pump is electrically connected to a control console, a water through hole 201 penetrating through the entire rotary shaft 2 is formed in the axial center of the rotary shaft 2, a water through hole 201 is also formed in the center of the first hydraulic cylinder 301, and the water through hole 201 is connected to the water storage tank 902 through a pipeline, a pump and a cooling joint 10; and the pump is electrically connected to the control console. In addition, a ball valve 502 is arranged on the drill bit test bench 5, one end of the ball valve 502 is communicated with the through hole 505 of the drill bit test bench 5, and the other end of the ball valve 502 is communicated with the water accumulation tank 901. When the drill bit detection test is performed, the cooling water can be introduced into the water through hole after the pump is opened, so as to cool the drill bit 8 and facilitate the flushing of broken iron scraps. The used cooling water is discharged from the through hole 505 to the water accumulation tank 901, and the water in the water accumulation tank 901 can be discharged to the water storage tank 902 for recycling.

When the drill bit test bench 5 is lifted, a lower end of the rotary shaft 2 is connected to the clamping device 13 through a rotary shaft joint 203; when the drill bit 8 is detected, the lower end of the rotary shaft 2 is connected to the drill bit 8; and when the rotary blowout preventer 4 is detected, the lower end of the rotary shaft 2 is connected to a test drill pipe 7. The clamping device 13 comprises a rod 1302, a claw 1301 and a driving mechanism for folding and unfolding the claw 1301 relative to the rod 1302, and the rotary shaft 2 is connected to the rod 1302 through the rotary shaft joint 203.

Figure 8:
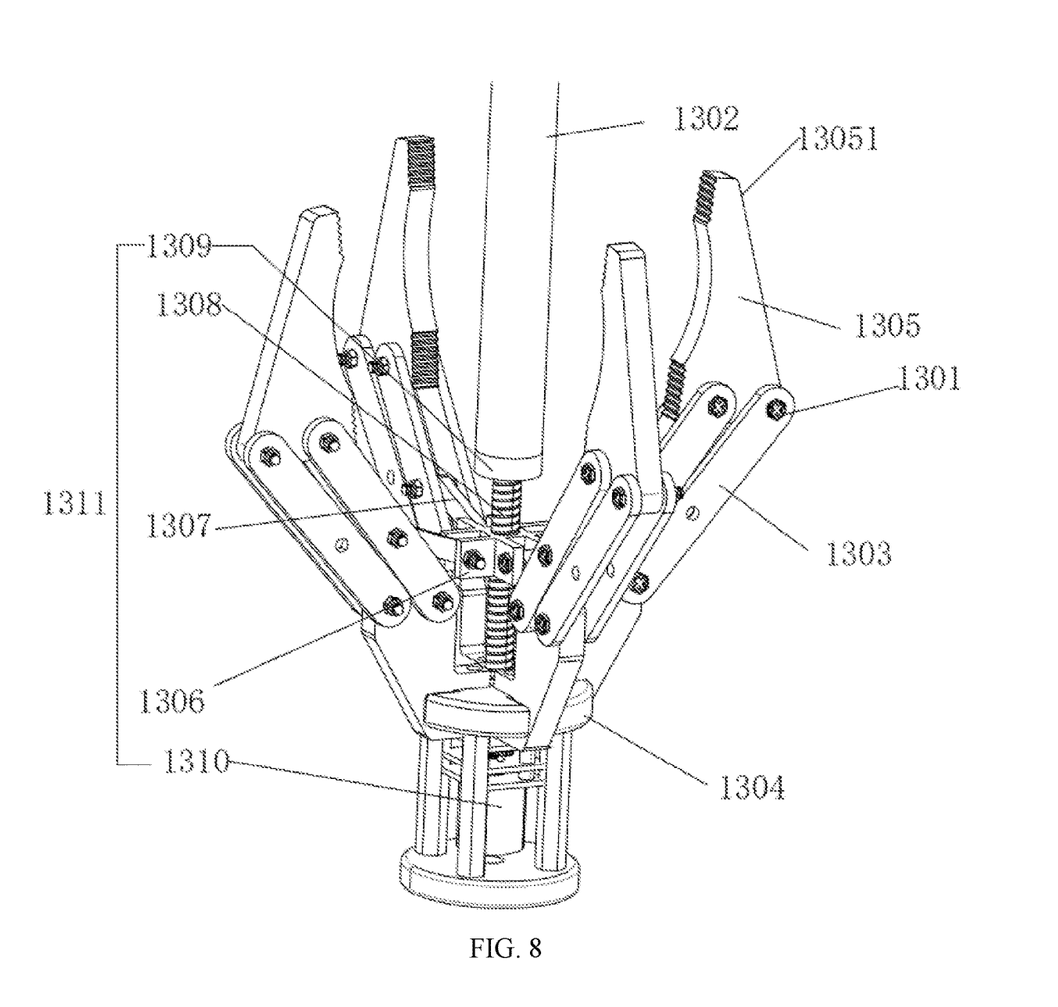
FIG. 8 is a schematic diagram of a structure of a clamping device.

Referring to FIG. 8, the claw 1301 comprises a rotary arm 1303, one end of the rotary arm 1303 is hinged with a clamp base 1304, and the other end of the rotary arm is hinged with a claw head 1305. An inner side of the claw head 1305 is provided with an anti-slip pattern, an outer side of the claw head is provided with a flexible pad 13051, an inner side of the claw head 1305 is in contact with the anti-slip platform, the anti-slip pattern on the claw head can increase a static friction force, and the flexible pad arranged on an outer side of the claw head can prevent the claw head 1305 from colliding with a wall of the through hole 505. The driving mechanism 1311 comprises a driving motor 1310 and a lead screw 1308 connected to a tail end of the rod 1302 through a bearing 1309, and the lead screw 1308 is not in contact with the rod 1302. The lead screw 1308 is connected to the clamp base 1304 through a bearing 1309, and one end of the lead screw 1308 penetrating through the clamp base 1304 is connected to the driving motor 1310 fixed on the clamp base 1304; and the lead screw is slidably connected to a sliding block 1306, and the rotary arm 1303 is hinged with the sliding block 1306 through a limiting connecting arm 1307.

An inner wall of the sliding block 1306 is provided with teeth threadedly matched with the lead screw, and the sliding block 1306, the driving motor and the lead screw form a sliding lead screw system. When the drill bit test bench 5 is lifted, the driving motor is started to rotate forward, the lead screw is driven to rotate, so that the sliding block 1306 is driven to move horizontally downwards along the lead screw, and the limiting connecting arm 1307 can pull the rotary arm 1303 downwards, so that the claw 1301 is in a folded state. The first hydraulic cylinder 301 is started to drive the clamping device 13 to move downwards, the clamping device 13 falls to the opening of the through hole 505, and the jaw 1301 in the folded state extends into the through hole 505; after the claw 1301 extends out of the through hole 505, the driving motor is started to rotate reversely, the sliding block 1306 is driven to move horizontally upwards along the lead screw, the limiting connecting arm 1307 pulls the rotary arm 1303 upwards to enable the claw 1301 to be in an open state, and after the claw head 1305 clamps the anti-slip platform of the through hole 505, when the first hydraulic cylinder 301 is started to move upwards, the claw 1301 drives the entire drill bit test bench 5 to move upwards together, and lifting work of the drill bit test bench 5 is completed.

The drill bit performance detection test mainly aims at drill bits used for oil and gas drilling, such as a cone bit, which can detect the damage of the drill bit 8 within a certain period of time when the drill bit 8 drills into the specimen, so as to prevent accidents caused by unqualified drill bits during the drilling. The test principle is that a specimen is drilled under the condition of normal temperature with a certain drilling pressure and a certain rotation speed, and the damage conditions of teeth, bearings and diameters of the drill bit are evaluated, so that the performance of the drill bit is scientifically detected, and clear water is preferably used as a cleaning solution.

Figure 4:
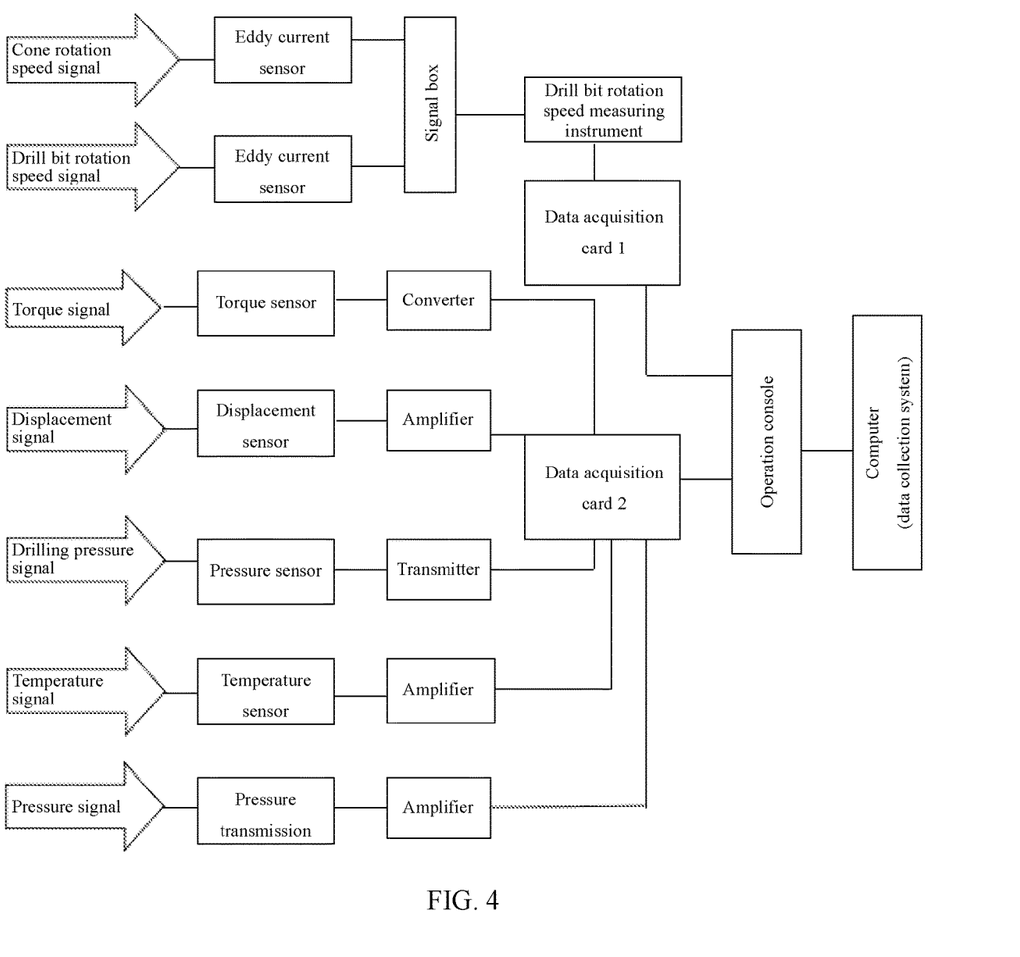
FIG. 4 is a diagram of a data acquisition system.

FIG. 4 is a diagram of a data acquisition system according to the present invention. The test device of the present invention is provided with an eddy current sensor 16 for monitoring the rotation speeds of the drill bit and a cone, a torque sensor 17 for monitoring the torque of the driving device 6, a displacement sensor 18 for monitoring the displacement conditions of the first hydraulic cylinder 301, the second hydraulic cylinder 302 and the third hydraulic cylinder 303, a pressure sensor 19 for monitoring the bit pressure during the drill bit detection test, a temperature sensor 20 for monitoring the temperature of the shell of the rotary blowout preventer 4 during the test of the rotary blowout preventer 4, a pressure transmission 21 for monitoring the piston pressures of the first hydraulic cylinder 301, the second hydraulic cylinder 302 and the third hydraulic cylinder 303, and a plurality of monitoring cameras 22 for observing the operation of the equipment. The eddy current sensor 16 is connected to a first data acquisition card 23; and the torque sensor 17 is connected to a second data acquisition card 24 sequentially through a converter, the displacement sensor 18, an amplifier, the temperature sensor 20, an amplifier, a pressure sensor 19, a transmitter, a pressure transmission 21 and an amplifier. The first data acquisition card 23, the second data acquisition card 24 and the camera 22 are electrically connected to the control console 25, and the control console 25 is provided with a plurality of control buttons and a display screen for displaying parameter change curves and real-time monitoring videos. All dynamic signals in the test process are used to obtain test data through developed control detection software, and finally test data and test curves of dynamic parameters changing along with time can be obtained and displayed on a display screen of the control console in real time.

The present invention can be used for the drill bit performance detection test and the rotary blowout preventer performance detection test, such as a sealing performance test, a fatigue test, a rubber core dismounting test, a pressure-bearing tripping life test, a rated dynamic pressure test, and a rotary dynamic sealing test, and has complete detection functions.

a. The preparation processes before and after the drill bit detection test are as follows: 1. fixing a drill bit test bench 5 on a transport vehicle 11, wherein an initial position of the drill bit test bench is positioned at one end of an L-shaped track far away from a fixed base 12; putting a specimen into a specimen platform 504, and pressing the specimen by adopting a pressing device 501; 2. moving the transport vehicle 11 and the drill bit test bench 5 thereon from the initial position to a turning point of the L-shaped track, and connecting the transport vehicle and the drill bit test bench with a piston rod of a third hydraulic cylinder 303, starting the third hydraulic cylinder 303 to push the transport vehicle 11 to a position right above the fixed base 12, and connecting a lower end of a rotary shaft 2 with a clamping device 13; 3. starting a first hydraulic cylinder 301 to drive the clamping device 13 to move vertically downwards, and starting a driving mechanism of the clamping device 13 to fold a claw 1301 and extend the folded claw into a through hole 505 of the drill bit test bench 5; 4. after the claw 1301 extends into the through hole 505, starting a driving motor of the clamping device 13 to open the claw 1301 and clamp the anti-slip platform at the bottom of the through hole 505, and controlling the clamping device 13 to move upwards by the first hydraulic cylinder 301 to lift the drill bit test bench 5; 5. moving away the transport vehicle 11, and putting down the drill bit test bench 5 to be fixedly connected to the fixed base 12; 6. disassembling the clamping device 13, connecting the lower end of the rotary shaft 2 with a drill bit 8, and performing the drill bit detection test; and 7. after completing the test, detaching the drill bit 8, mounting the clamping device 13, lifting the drill bit test bench 5 and placing on the transport vehicle 11, pulling the transport vehicle 11 back to the turning point by the third hydraulic cylinder 303, and manually returning the transport vehicle 11 and the drill bit test bench 5 thereon to the initial position.

b. The preparation processes before and after the rotary blowout preventer detection test are as follows: 1. placing the transport vehicle at the turning point of the L-shaped track, hoisting the rotary blowout preventer 4 onto the transport vehicle 11 in the pit by an overhead crane, and connecting the transport vehicle 11 with a piston rod of the third hydraulic cylinder 303; 2. pushing the transport vehicle 11 to be right below the second hydraulic cylinder 302 by the third hydraulic cylinder 303, starting the second hydraulic cylinder 302 to press the test drill pipe 7 into the rotary blowout preventer 4, and fixedly connecting the test drill pipe 7 with the rotary blowout preventer 4; 3. continuing to push the transport vehicle 11 to a position right below the rotary shaft 2 by the third hydraulic cylinder 303, and connecting the rotary shaft 2 with the test drill pipe 7; 4. starting the first hydraulic cylinder 301 to hoist the rotary blowout preventer 4 and move the transport vehicle 11 away, mounting the connecting base with the wellhead flange on the fixed base 12, and then mounting the rotary blowout preventer 4 on the connecting base with the wellhead flange; 5. performing the rotary blowout preventer detection test; and 6. after the test is completed, pulling the rotary blowout preventer 4 to a predetermined position of the second hydraulic cylinder 302 by the third hydraulic cylinder 303 to take out the test drill pipe 7, and pulling the rotary blowout preventer 4 to an initial position to lift the pit.

c. Examples of operation of the rotary dynamic seal test of the rotary blowout preventer 4 are as follows: filling the cavity of the rotary blowout preventer 4 with clear water, wiping off the water stains, slowly increasing the pressure step by step through the pressure test pump, stabilizing the pressure for 5 min under a sealing pressure of 1.4-2.1 MPa, and then gradually increasing the pressure to the maximum working pressure, sealing the test drill pipe 7 by the rubber core of the rotary blowout preventer 4 under the maximum working pressure, making the rotary shaft 2 drive the test drill pipe 7 to rotate at a rotation speed less than or equal to 90 r/min, and driving the test drill pipe 7 to reciprocate up and down by the first hydraulic cylinder 301. After the test is completed, if the sealing part has no leakage, the dynamic sealing pressure test of this batch of products is qualified, otherwise, this batch of products is unqualified. The test aims to simulate whether the sealing performance of the rotary blowout preventer 4 meets the requirement in the process that the drilling tool continuously maintains drilling and performing drilling under pressure when there is a certain casing pressure at the wellhead.

In conclusion, the present invention develops an integrated detection test device for a drill bit and a rotary blowout preventer with complete functions, which significantly saves the test space and the test cost.

The specific embodiments of the present invention have been described in detail in conjunction with the drawings, however, it should not be construed as limiting the scope of protection of the present invention. Various modifications and variations that can be made within the scope described in the claims by those skilled in the art without creative efforts still belong to the protection scope of the present invention.

What is claimed is:

1. An integrated detection test device for a drill bit and a rotary blowout preventer, comprising: a support frame, wherein a rotary shaft is mounted on the support frame, and an upper end of the rotary shaft is connected to a first hydraulic cylinder fixed on the support frame; the rotary shaft is connected to a driving device through a rotary disc sleeved outside the rotary shaft;

a pit sinking to a fixing plane of the support frame is arranged below the support frame; an L-shaped track and a transport vehicle slidably connected to the track are mounted in the pit, the transport vehicle is connected to a piston rod of a third hydraulic cylinder when reaching a preset position, and the first hydraulic cylinder and the third hydraulic cylinder are both connected to a hydraulic station;

a fixed base for fixing a drill bit test bench is mounted at a tail end of the track positioned right below the support frame; the drill bit test bench comprises a specimen platform, a specimen groove for placing a specimen is formed in the specimen platform, and a through hole penetrating through the specimen platform is formed in a bottom of the specimen groove; a platform support base is fixed at a bottom of the specimen platform and is connected to the fixed base in a detection state; a cavity for accommodating a clamping device is arranged inside the platform support base; a pressing device for pressing the specimen is movably connected to the specimen platform;

when the drill bit test bench is lifted by the first hydraulic cylinder to control the clamping device to move upwards, a lower end of the rotary shaft is capable of being connected to the clamping device through a rotary shaft joint;

when the drill bit is detected, the lower end of the rotary shaft is capable of being connected to the drill bit with a screw;

when the rotary blowout preventer is detected, the lower end of the rotary shaft is capable of being connected to a test drill pipe with a screw;

the clamping device comprises a rod, a claw and a driving mechanism for folding and unfolding the claw relative to the rod, and the rotary shaft is connected to the rod through the rotary shaft joint; and     a control console and a pressure test pump are mounted on one side of the hydraulic station; and the hydraulic station, the driving device and the pressure test pump are all electrically connected to the control console.

2. The integrated detection test device for the drill bit and the rotary blowout preventer according to claim 1, wherein a water accumulation tank sinking to a bottom surface of the pit is also arranged in the pit, the water accumulation tank is connected to a water storage tank through a first pump and a first pipeline, and the first pump is electrically connected to the control console; a water through hole penetrating through the entire rotary shaft is formed in an axial center of the rotary shaft, and the water through hole is formed in a center of the first hydraulic cylinder; the water through hole is connected to the water storage tank through a second pipeline, a second pump and a cooling joint, and the second pump is electrically connected to the control console; and a ball valve is arranged on the drill bit test bench, one end of the ball valve is communicated with the through hole, and the other end of the ball valve is communicated with the water accumulation tank.

3. The integrated detection test device for the drill bit and the rotary blowout preventer according to claim 1, wherein the driving device comprises a coupler, a motor and a driver which are connected in sequence, and the coupler is connected to the rotary disc.

4. The integrated detection test device for the drill bit and the rotary blowout preventer according to claim 3, wherein the rotary disc comprises a rotary disc base and a rotary disc bushing, a support base for supporting the first hydraulic cylinder is mounted on the rotary disc base, a center of the rotary disc base is connected to the rotary disc bushing through a rotary bearing, and a spline groove matched with a spline shaft of the rotary shaft is formed in an inner wall of the rotary disc bushing; and a plurality of conical toothed discs are sleeved outside the rotary disc bushing, the conical toothed discs are vertical to and meshed with a conical gear, and a shaft of the conical gear is fixed on the support base through a bearing and connected to the coupler.

5. The integrated detection test device for the drill bit and the rotary blowout preventer according to claim 1, wherein a second hydraulic cylinder is also mounted on the support frame, the test drill pipe is connected to a piston rod of the second hydraulic cylinder in a non-detection state, and the second hydraulic cylinder is connected to the hydraulic station.

6. The integrated detection test device for the drill bit and the rotary blowout preventer according to claim 1, wherein the claw comprises a rotary arm, one end of the rotary arm is hinged with a clamp base, and the other end of the rotary arm is hinged with a claw head; an inner side of the claw head is provided with an anti-slip platform, and an outer side of the claw head is provided with a flexible pad; the anti-slip platform for clamping the claw is arranged around a bottom of the through hole;

the driving mechanism comprises a driving motor and a lead screw connected to a tail end of the rod through a bearing, and the lead screw is not in contact with the rod; the lead screw is connected to the clamp base through another one bearing, and one end of the lead screw penetrating through the clamp base is connected to the driving motor fixed on the clamp base; and the lead screw is slidably connected to a sliding block, and the rotary arm is hinged with the sliding block through a limiting connecting arm.

7. The integrated detection test device for the drill bit and the rotary blowout preventer according to claim 1, wherein a plurality of counter bores are arranged at a bottom of the platform support base, and a bottom of the rotary blowout preventer is corresponding provided with another plurality of counter bores; and a plurality of connecting members matched with the counter bores at the bottom of the platform support base and the bottom of the rotary blowout preventer are arranged on the transport vehicle.

8. The integrated detection test device for the drill bit and the rotary blowout preventer according to claim 1, wherein the pressing device comprises a threaded rod and a locking nut, and a pressing plate is fixed at one end of the threaded rod extending into the specimen platform.

9. The integrated detection test device for the drill bit and the rotary blowout preventer according to claim 1, wherein the test device is provided with an eddy current sensor for monitoring a rotation speed of the drill bit, a torque sensor for monitoring a torque of the driving device, a displacement sensor for monitoring displacement conditions of the first hydraulic cylinder, the second hydraulic cylinder and the third hydraulic cylinder, a pressure sensor for monitoring a bit pressure during a drill bit detection test, a temperature sensor for monitoring the temperature of a rotary blowout preventer shell, a pressure transmission for monitoring piston pressures of the first hydraulic cylinder, the second hydraulic cylinder and the third hydraulic cylinder, and a plurality of monitoring cameras for observing an operation of the detection test device;

the eddy current sensor is connected to a first data acquisition card; the torque sensor, the displacement sensor, the temperature sensor, the pressure sensor and the pressure transmission are all connected to a second data acquisition card; the first data acquisition card, the second data acquisition card and the camera are electrically connected to the control console; and the control console is provided with a plurality of control buttons and a display screen for displaying parameter change curves and real-time monitoring videos.

10. A method for performing a drill bit detection test by using the integrated detection test device for the drill bit and the rotary blowout preventer according to claim 1, comprising the following steps:

S1: fixing the drill bit test bench on the transport vehicle, wherein an initial position of the drill bit test bench is positioned at one end of the L-shaped track far away from the fixed base; putting the specimen into the specimen platform, and pressing the specimen by using the pressing device;

S2: moving the transport vehicle and the drill bit test bench thereon from the initial position to a turning point of the L-shaped track, and connecting the transport vehicle and the drill bit test bench with the piston rod of the third hydraulic cylinder; starting the third hydraulic cylinder to push the transport vehicle to a position right above the fixed base, and connecting the lower end of the rotary shaft with the clamping device;

S3: starting the first hydraulic cylinder to drive the clamping device to move vertically downwards, and starting the driving mechanism of the clamping device to fold the claw and extend a folded claw into the through hole;

S4: after the claw extends into the through hole, starting a driving motor of the clamping device to open the claw and clamp an anti-slip platform at a bottom of the through hole, and controlling the clamping device to move upwards by the first hydraulic cylinder to lift the drill bit test bench;

S5: moving away the transport vehicle, and putting down the drill bit test bench to be fixedly connected to the fixed base;

S6: disassembling the clamping device, connecting the lower end of the rotary shaft with the drill bit, and performing the drill bit detection test; and S7: after completing the test, detaching the drill bit, mounting the clamping device, lifting the drill bit test bench and placing on the transport vehicle, pulling the transport vehicle back to the turning point by the third hydraulic cylinder, and returning the transport vehicle and the drill bit test bench thereon to the initial position.

* * * * *